United States Patent [19]
Balabine et al.

[11] Patent Number: 5,937,406
[45] Date of Patent: Aug. 10, 1999

[54] FILE SYSTEM INTERFACE TO A DATABASE

[75] Inventors: Igor V. Balabine; Ramiah Kandasamy, both of Cupertino; John A. Skier, San Jose, all of Calif.

[73] Assignee: Informix Software, Inc., Menlo Park, Calif.

[21] Appl. No.: 08/792,139

[22] Filed: Jan. 31, 1997

[51] Int. Cl.$^6$ .................................................. G06F 17/30
[52] U.S. Cl. .......................... 707/100; 707/102; 707/200
[58] Field of Search ........................... 707/1–4, 100–104, 707/200–201

[56] References Cited

U.S. PATENT DOCUMENTS

| | | | |
|---|---|---|---|
| 5,689,698 | 11/1997 | Jones et al. | 707/4 |
| 5,694,598 | 12/1997 | Durand et al. | 707/103 |
| 5,737,736 | 4/1998 | Chang | 707/102 |
| 5,761,673 | 6/1998 | Bookman et al. | 707/104 |
| 5,805,804 | 9/1998 | Laursen et al. | 395/200.02 |
| 5,809,266 | 9/1998 | Andre et al. | 395/340 |

OTHER PUBLICATIONS

"Large Objects Support in POSTGRES," Stonebraker et al., Proceedings of the Ninth International Conference on Data Engineering, Vienna, Austria, pp. 355–362, Apr. 1993.

"Databases and Multimedia," Joe Salemi, Network VAR, v3, n10, p. 29(6), available on–line at http://www.dialogweb.com, Dialog File 275, Oct. 1995.

Olson, Michael A. "The Design and Implementation of the Inversion File System," Sequoia 2000 Technical Report, Report #93/28, University of California at Berkeley, Apr. 1993.

*Primary Examiner*—Thomas G. Black
*Assistant Examiner*—Hosain T. Alam
*Attorney, Agent, or Firm*—Fish & Richardson P.C.

[57] ABSTRACT

Information in a database is accessed with a computer system by transforming a file system request from an application into a database query and retrieving information corresponding to the database query from the database. The retrieved information is made available to the application as a file system object, for example, as a directory, a file, a link or a collection thereof.

54 Claims, 11 Drawing Sheets

Microfiche Appendix Included
(2 Microfiche, 138 Pages)

FILE SYSTEM INTERFACE TO A DATABASE

REFERENCE TO MICROFICHE APPENDIX

This application includes a microfiche appendix having a total of 138 frames in 2 microfiche sheets.

BACKGROUND

This invention relates to accessing information in a database.

A database is a body of information that is logically organized so that it can be retrieved, stored and searched in a coherent manner by a "database engine"—a collection of software methods for retrieving or manipulating data in the database. Databases generally fall into three categories: relational databases, object-oriented databases and object-relational databases.

Figure 1:
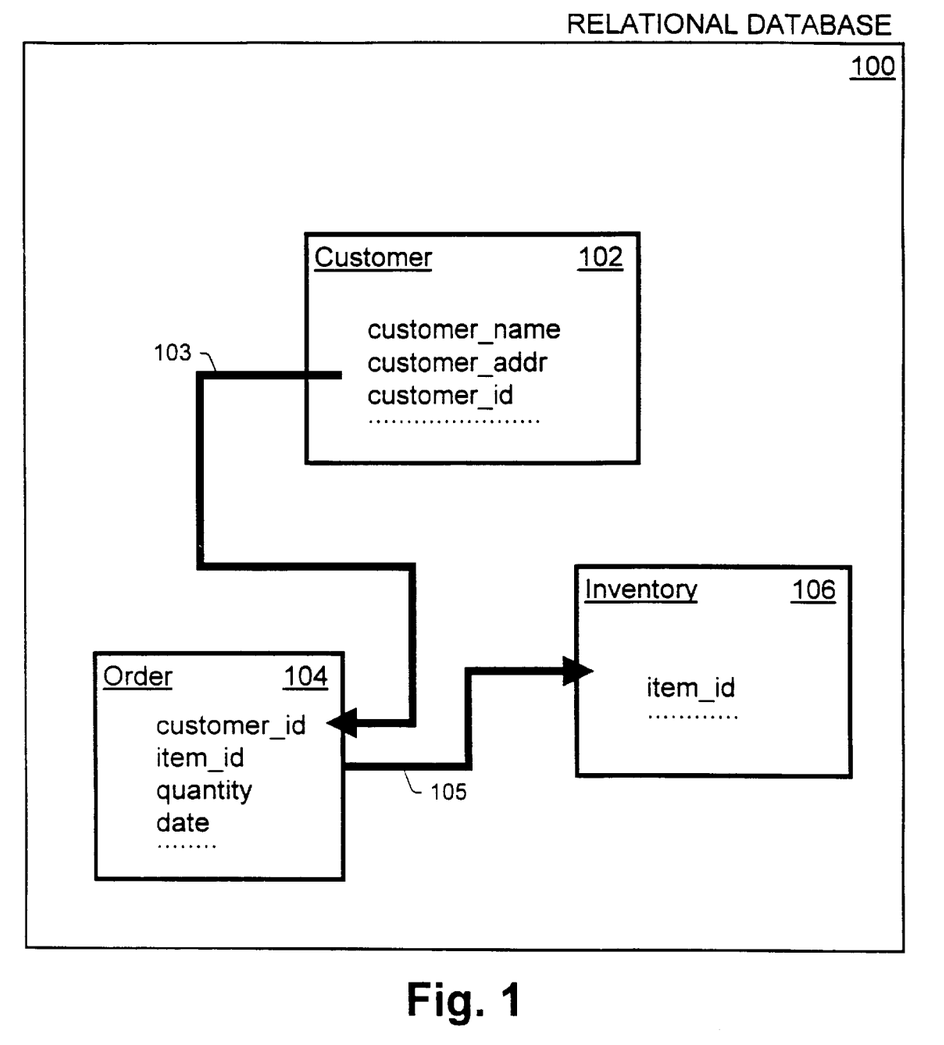
FIG. 1 is a diagram of a relational database.

A relational database (RDB) is a collection of fixed-field two-dimensional tables that can be related (or "joined") to each other in virtually any manner a database developer chooses. The structure of a relational database can be modified by selectively redefining the relationships between the tables. A database engine may perform complex searches on a relational database quickly and easily by using any of various database query protocols such as the method expressed by the Structured Query Language (SQL) or by other mechanisms. The relationships between the tables enable results of a search to be automatically cross-referenced to corresponding information in other tables in the database. As shown in FIG. 1, for example, a relational database 100 includes a customer table 102 which is joined by a logical link 103 to an order table 104 which in turn is joined by a logical link 105 to an inventory table 106. A user may query the database 100, for example, for all order numbers higher than a threshold value. Because the order table 104 is joined with the customer table 102 and the inventory table 106, the list of order numbers resulting from the query can be retrieved and displayed along with the respective customer names and inventory items that correspond to the identified order numbers.

An object-oriented database (OODB) is a collection of "objects"—software elements that contain both data and rules for manipulating that data. In contrast to a relational database which can store only character-type data, an OODB can store data of virtually any type (text, 3D graphic images, video clips, etc.). An OODB stores its constituent objects in a hierarchy of classes with associated rules so that the OODB contains much of the logic it needs to do useful work. A relational database in contrast contains only data and must rely on external application software to perform useful functions with the data.

A object-relational database (ORDB) is a hybrid of the other two types. Non-character data (e.g., an image file) may be stored and retrieved in an ORDB as a binary large object (BLOB)—an undifferentiated mass of data. Rules for manipulating the data contained within a BLOB (e.g., a utility for viewing image files) may be stored either within the database or external to it depending on the particular ORDB implementation. The Informix® Universal Server (IUS®) is an example of an object-relational database management system (ORDBMS) that internally stores the rules for manipulating BLOBs so that they may be treated as "native" data types—that is, data types that the ORDBMS itself has the capability to manipulate.

Information within a relational or an object-relational database typically is accessed by SQL-compliant computer programs that are written to accomplish a specific function. For example, a user may write a SQL program that retrieves a list of customer names from a database which stores customer information. Alternatively, many different application programs are available that support database queries and which allow a user to interactively formulate a database query by specifying an arbitrary set of criteria (e.g., the names of all out-of-state customers with overdue accounts). This type of application program presents the user's database query to the database engine which retrieves the requested information from the database. Such application programs are referred to as "database aware" because they are have the ability to interact with and manipulate databases.

Figure 2:
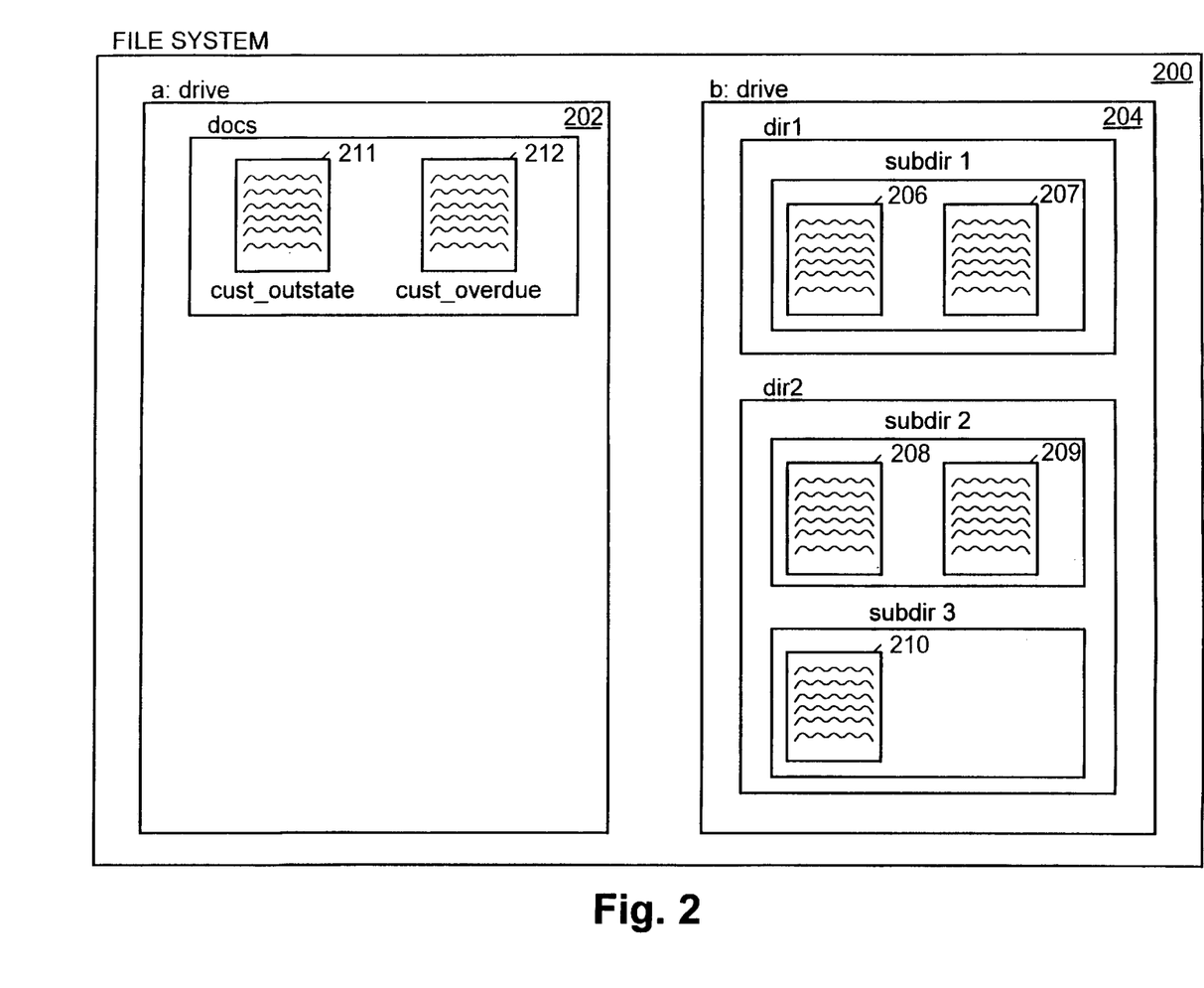
FIG. 2 is a diagram of a file system.

Most application programs, in contrast, are "database-unaware" meaning that they cannot access information stored in a database. Rather, database-unaware applications rely on file systems, such as the Network File System (NFS) developed by Sun Microsystems, Inc., for storing and retrieving information in discrete files. A database-unaware program stores each separate document in a separate disk file identified by the user of the application. In FIG. 2, for example, a file system 200 has two disk drives mounted: drive 202 which is mapped to the label a: and drive 204 which is mapped to the label b:. Each of the a: and b: drives includes one or more directories (docs on the a: drive 202; dir1 and dir2 on the b: drive 204) which in turn may have subdirectories (subdir1 in dir1; subdir2 and subdir3 in dir2) and so on with virtually any level of hierarchical nesting being possible. Files 206–212 may exist at any of the various directory or subdirectory levels within the file system. The labels a: and b: represent the "namespace" of the file system. That is, all filename paths that begin with a: or b: are within the file system's namespace. As shown in FIG. 2, for example, a document that lists names of out-of-state customers is stored in the file system's namespace at a location defined by the filename path a:\docs\cust_outstate.txt which means that a file 211 named "cust_outstate" of the type "txt" is stored in a directory named docs on a disk drive 202 mapped to the label a:. Another document that lists names of customers with overdue accounts is stored in a separate disk file located at the filename path a:\docs\cust_overdue.txt.

These two files are separate and distinct entities that are not related or joined in the sense that tables in a database are related.

SUMMARY

In one aspect of the invention, information in a database is accessed with a computer system by making one or more database objects (e.g., a table or a row) available as one or more file system objects (e.g., directories, files or links) to an application, for example, a database-unaware application. The database may be relational, object-relational or object-oriented. If multiple file system objects are made available, collectively they may represent a hierarchical file system. A file system request issued by the application that corresponds to the file system object is transformed into a database operation, for example, an SQL query, which is performed on the database with a database engine.

Information associated with the database object which is retrieved as a result of the database operation may be formatted into one or more file system objects and returned to the application. The particular formatting of the retrieved information may be defined in an extension module, which also may include information that defines the specific manner in which the file system request should be transformed into a database query. The database operations, including formatting of a database query, retrieving information and formatting it into file system objects, are performed transparently to the application.

Upon receiving the file system objects, the application may display them on a display screen of a computer, for example, as graphical representations of file system objects. The database object that is made available may be presented as multiple file system objects in formats understandable by different applications. Conversely, a single file system object may correspond to multiple database objects.

In another aspect, a computer-based data repository management system includes a database of information, a file system-based application program for manipulating data, and a file system interface to the database which provides the file system-based application, which otherwise may be database-unaware, with access to information in the database. The data repository management system may further include a database management system which manages information in the database either in addition to, or instead of, the file system-based application.

The data repository management system may include a module for differentiating file system requests directed to the file system from file system requests directed to the file system interface. The file system interface may include one or more extension modules containing one or more file objects, each file object including information for converting database objects into file system objects.

In another aspect, information in a database is accessed with a computer system by encoding a file handle with information that specifies a database object in a database. In response to a file system request issued by an application, the encoded file handle is transmitted and then decoded to identify the database object associated with the file system request. The encoding may be based on the NFS protocol. The encoded information may include information that corresponds to the issued file system request and which identifies an extension module, a database table and row, metadata, a pointer to a database object, or a combination thereof.

Advantages of the file system interface described here may include one or more of the following. Applications that rely on a file system as a data repository, or which are otherwise database-unaware (i.e., unable to access data in a database), are enabled to access information in a database in a transparent manner. These database-unaware applications can share data seamlessly both with database-aware applications and with other database-unaware applications. Under IXFS, a database may appear to an application as just another local or remote file system that is no different in form or character from the other file systems available to the application. No change to the application's program code, the database or the database engine is required. As a result, users of database-unaware applications are provided with database functionality without having to invest the time and cost typically associated with database-aware tools.

A system administrator may use the IXFS system to combine disparate data storage technologies (e.g., file-based systems with database systems) in creating a unified data repository strategy that spans an enterprise. The enterprise's investment in legacy data repositories is maintained because data present in the repositories may easily be transferred to a database as the enterprise moves to the relational or object-relational model of data storage. Moreover, the enterprise's investment in database-unaware applications is enhanced because IXFS enables them to be used to manage data stored in a database.

The ability for a database-unaware application to access information in a database combines the simplicity of the file system paradigm with the sophistication and effectiveness of database manipulation techniques. This capability is particularly useful for Internet World Wide Web applications in which a user seeks to access a large store of data using, for example, the hypertext transfer protocol (HTTP). In contrast to a common gateway interface (CGI) script, which spawns an external application to retrieve data from a database in response to a URL (Uniform Resource Locator) encoded request, the IXFS system converts such a request into a form that may be executed by a database engine directly, quickly and transparently.

The ability to represent an arbitrary collection of tables in a database as various file system objects provides a software developer with a rich and flexible set of tools. The extensible nature of IXFS allows it to be tailored to virtually any type of application so that the database will appear as a collection of file system objects that are consistent with the application's other file system objects.

Other advantages and features will become apparent from the following description, including the drawings and claims.

DETAILED DESCRIPTION

The use of a database to store persistent data provides several advantages that are not available when a file system is used as a data repository. The structure of a database, and the internal relationships between tables within the database, enable fast and arbitrarily complex queries for information to be performed on the database. A file system in contrast has no standard data query mechanism for searching for specific data items within the files managed by the file system. Other features provided by database systems for which conventional file systems have no analog include well-defined management policies, auditing capabilities, transparent data replication, logging facilities, and consistent backup and restore procedures.

Using a database system as a data repository requires relatively complex and expensive tools, such as special purpose database-aware applications, and often an increased level of sophistication and training by the end-user. File systems in contrast generally are simple to use, cheap and pervasive. Virtually every computer operating system provides a native file system that may be used by applications for storing persistent data. This among other reasons is why approximately 85–90% of all persistent data is stored in file systems by database-unaware applications.

The file system interface described here, dubbed the Informix® File System (IXFS) interface, provides computer system users with the best of both worlds by enabling database-unaware applications to access (i.e., read and write) information in a database in a manner that is entirely transparent to the application. No changes need to be made to the application or to the database. IXFS presents the contents of a database to the application as "file system objects" such as directories, sub-directories, files or links. These file system objects appear to the application to be no different in form or character from the file system objects that the application handles in the ordinary course of storing and retrieving data. IXFS enables a user of a database-unaware application to access the contents of a database by performing the desired operations on the file system objects that represent the database's contents. A functional specification for IXFS is reproduced as Appendix A, which is incorporated by reference.

Figure 3:
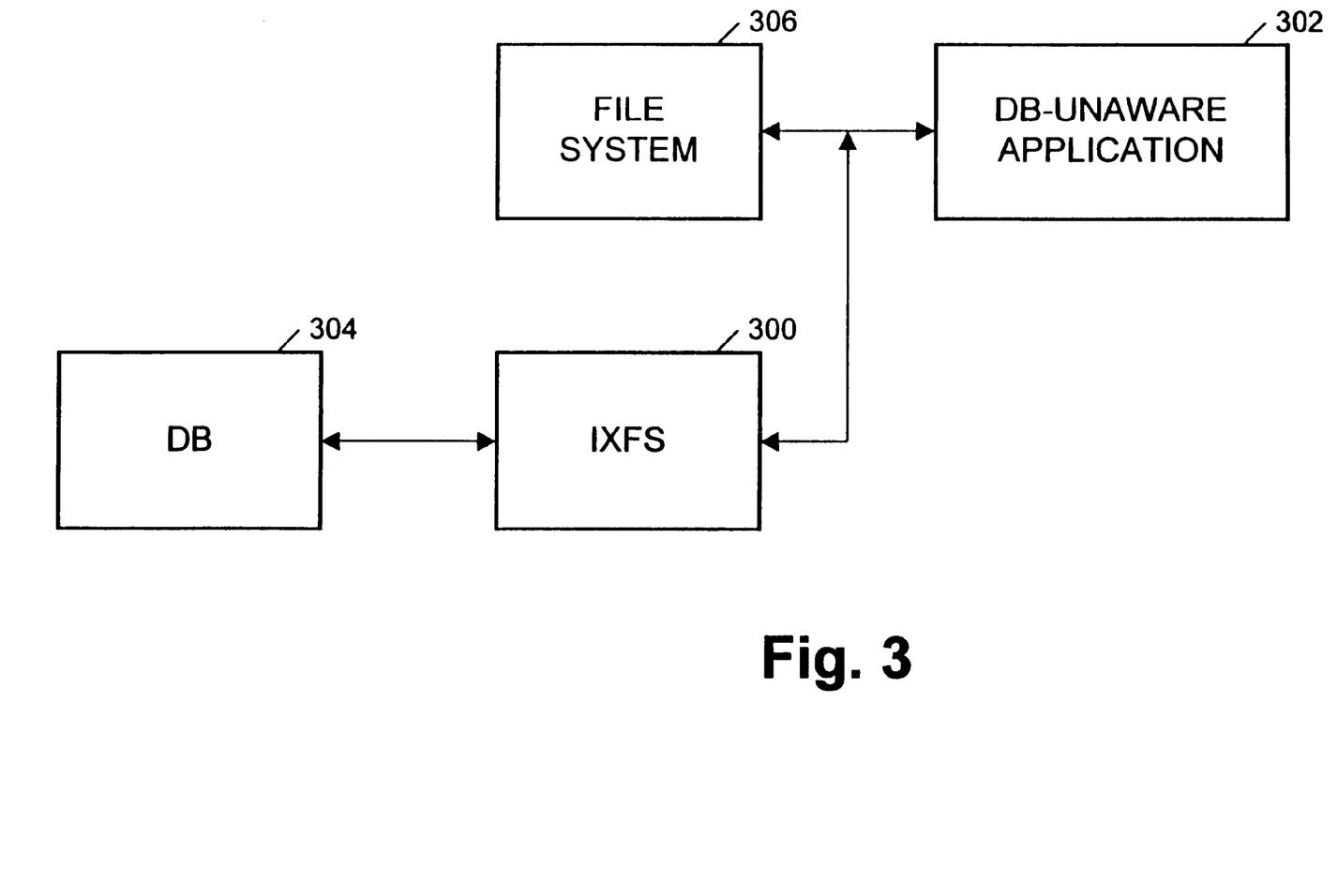
FIG. 3 is a diagram of a system for accessing data in file system and in a database.

As shown in FIG. 3, IXFS 300 sits between a database-unaware application 302 and a database 304 and monitors all requests issued to the file system 306 by the application 302. When the application seeks to access information in the database, a component of the IXFS system translates the file system request into a database query format that is understandable by the database. Similarly, information received from the database (in response to a file system read request by the application, for example) is represented to the application as one or more file system objects.

Figure 4:
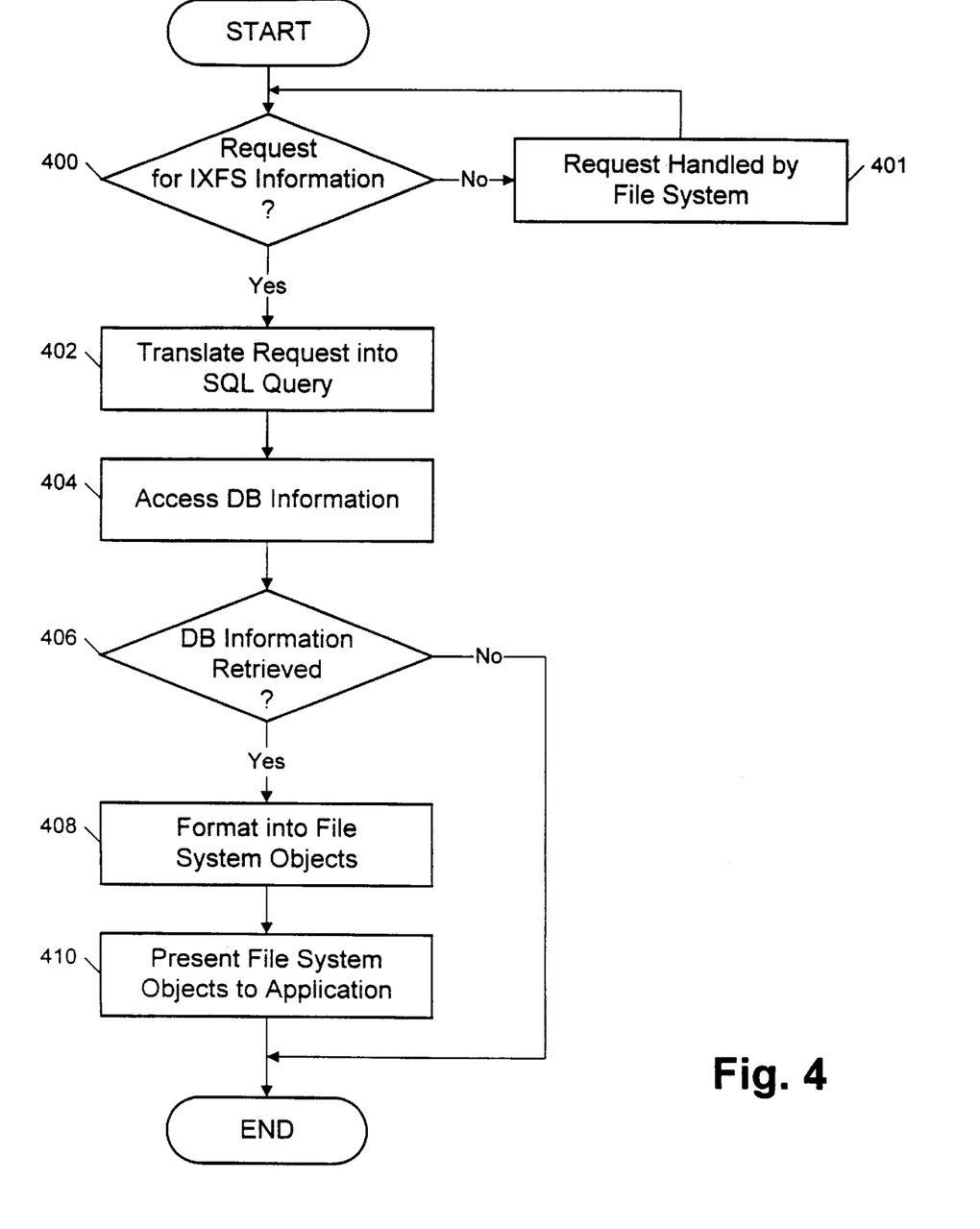
FIG. 4 is a flowchart of accessing data in a database using the system of FIG. 3.

A high-level description of the operation of IXFS and its interaction with the computer's operating system is provided with reference to the flowchart of FIG. 4. When a file system request (e.g. a data read or write) is issued by an application program, the operating system determines whether it corresponds to information contained in a file namespace managed by IXFS (step 400). The operating system is able to differentiate requests for data stored in other file systems from requests for data in IXFS's file namespace because the database has been mapped to a namespace (e.g., x:) that is mutually exclusive with the file system's namespace (e.g., a: and b:). In effect, the database appears to the operating system and to the application as a disk drive mapped to the label x:.

If the file system request is not directed towards information managed by IXFS, the request is handled by other file systems (step 401). If, on the other hand, the file system request corresponds to information in IXFS's file namespace, the operating system passes the request onto IXFS which in turn furnishes the request to an extensible component of IXFS, i.e., an "extension module," for translation into a form understandable by the database—an SQL query, for example—(step 402). After the request has translated into a database query, the IXFS extension module presents the query to the database engine which uses it to access the database either by modifying the desired information (for a write request) or by retrieving the desired information (for a read request) and returning it to IXFS (step 404). If information has been retrieved from the database (step 406), the IXFS extension module formats it according to predefined criteria into file system objects (step 408) which are presented to the application (step 410). Upon receiving the file system objects from IXFS, the application treats them as if they came from a file system. In fact, the application is unaware that the file system objects came from a source other than a file system. In this manner, all requests for data in the file system's namespace are handled by the file system while all requests for data in the file namespace assigned to the database are handled by IXFS.

Figure 5A:
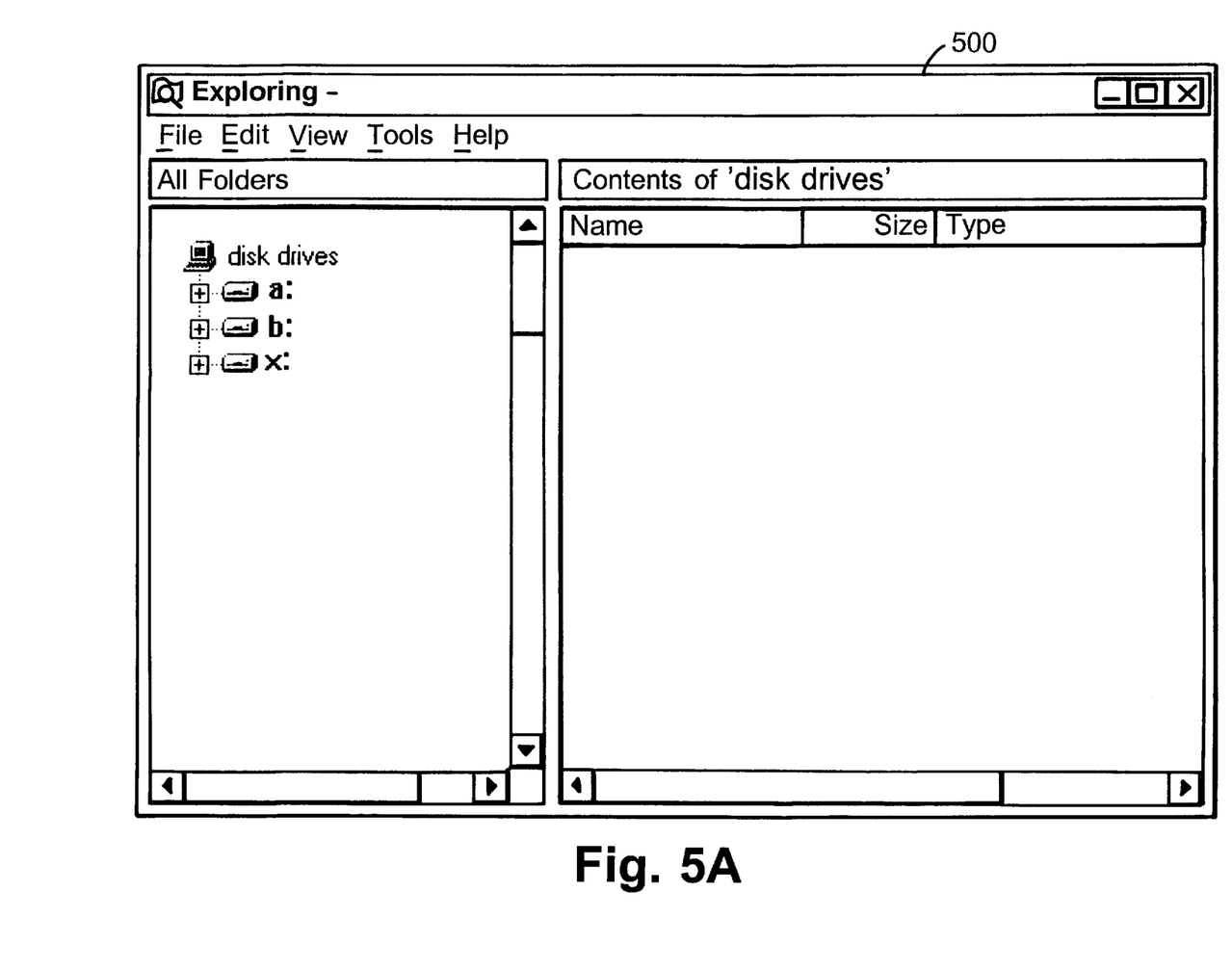
FIGS. 5A, 5B and 5C are example screen displays from an application accessing information in a file system and in a database.
Figure 5B:
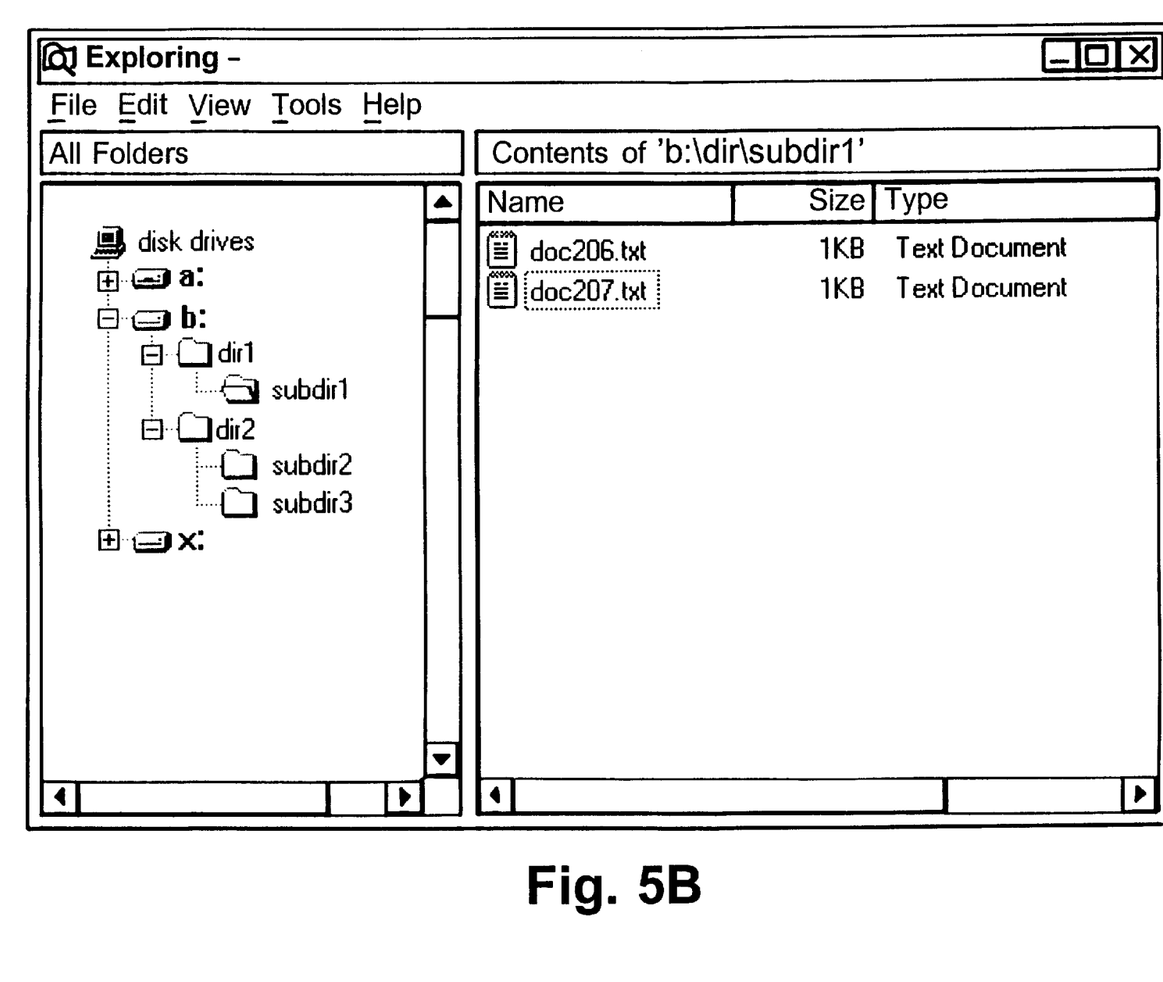
Figure 5C:
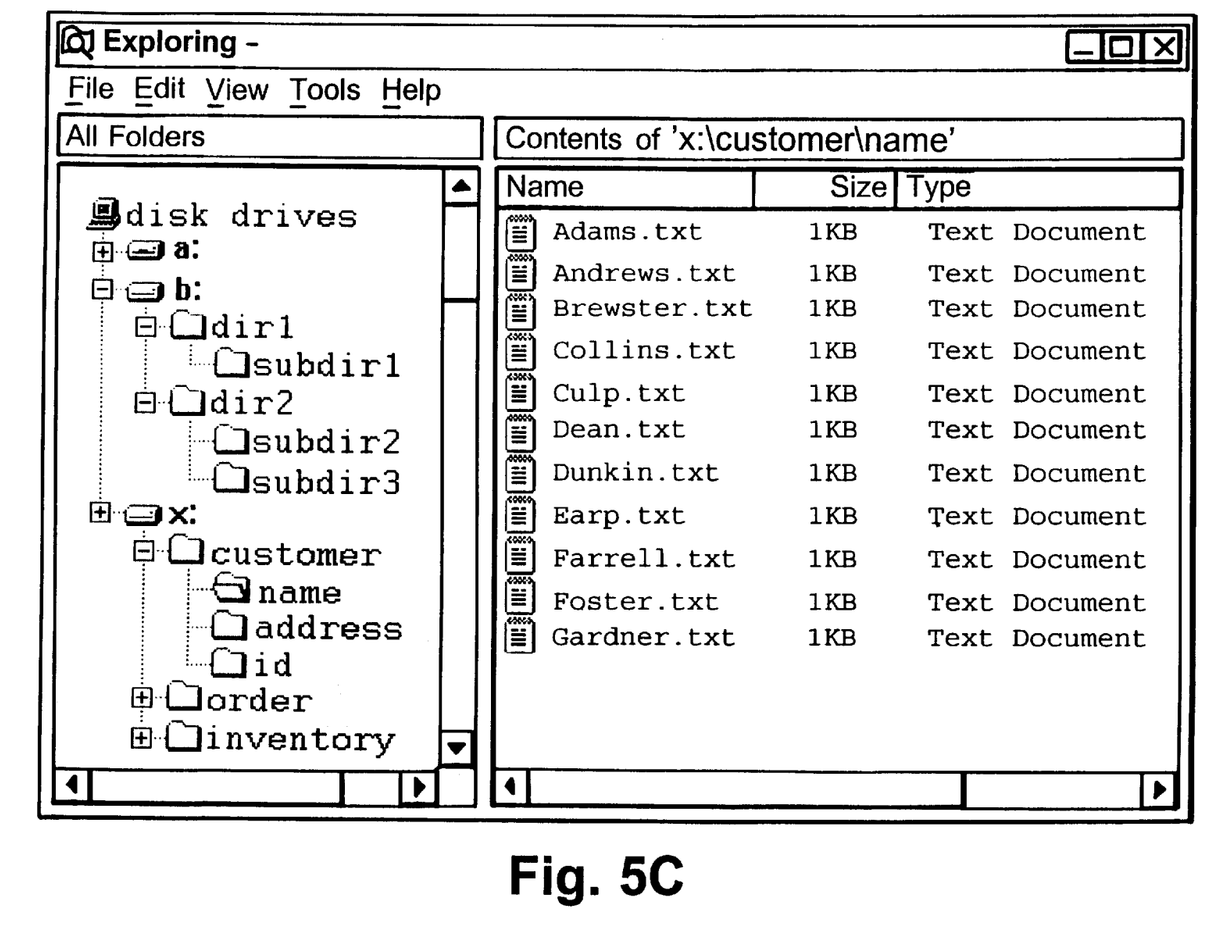

An example of how IXFS may be used to represent a database as a file system to an application is provided with reference to FIGS. 5A–5C. Assume that a user of a window-based computer system uses a file system navigation tool to examine the information that is stored both in the file system represented by FIG. 2 and in the database represented by FIG. 1. Assume further that the file system's namespace is represented by the labels a: and b: and that IXFS is mapped to drive x: on the client machine. As shown in Fig. S5, the navigation tool window 500 initially displays the file system's two drives, a: and b:, and the drive x: corresponding to the database, in a collapsed state. At this point the user instructs the navigation tool to expand drive b:, thereby making its hierarchy of directories and subdirectories visible to the user, and opens subdir1 which contains two files, doc206.txt and doc207.txt, as shown in FIG. 5B. The file information displayed in FIG. 5B is retrieved from the a: and b: drives using standard file system operations.

Next, the user instructs the navigation tool to expand drive x:, which is mapped to the database via IXFS, so that the contents of drive x: may be examined. Because the corresponding file system request issued by the navigation tool points to drive x:—the file namespace assigned to the database—IXFS handles the file system request by passing it to an extension module which formulates a database query to retrieve the requested information from the database. After the information has been retrieved, it is formatted into file system objects with a method invoked by IXFS and returned to the navigation tool. The information retrieved from the database appears to the navigation tool, and to the user of the navigation tool, to be no different in character from other file system objects that were retrieved with the file system. As shown in FIG. 5C, tables 102, 104 and 106 in the database 100 of FIG. 1 are represented as three corresponding directories—customer, order and inventory. Similarly, three rows within the customer table 102—customer_name, customer_addr and customer_id—are represented as three corresponding subdirectories within the customer directory—name, address and id. Entries in the name subdirectory are represented as text files that are named for their respective contents—Adams, Andrews, Brewster, etc.

A user may open any of the text files in the x:\customer\name directory (for example, with a standard text editor application) modify its contents, and perform a standard "file save" operation. In response, IXFS handles the file save request because it is directed to the file namespace assigned to the database and formulates a corresponding database operation to modify the contents of the database as appropriate.

IXFS allows all file system operations to be performed on the database. For example, a user could employ appropriate features of the navigation tool to change the name of the x:\customer directory to something else such as x:\cust. Similarly, a user could create a new file system object such as a subdirectory or a new file underneath the x:\customer directory. Moreover, access to specified portions of the database could be limited for certain users in the same manner that file system objects in a file system may be limited (read only, hidden, etc.).

The specific types, formats and arrangement of file system objects that IXFS will return in response to a file system request are defined in a corresponding extension module—a software component of IXFS that may be tailored as desired to encapsulate an arbitrary collection of database objects (e.g., tables) and represent them as a collection of file system objects. In one implementation, IXFS includes a Basic Extension Module (BEM) that provides a one-to-one mapping of a file in a file system into a collection of database objects. Among other uses, the BEM allows users to quickly and transparently move their data from a file system into the IUS™ database management system and run database queries against it. The source code for the IXFS BEM is reproduced in the microfiche appendix.

The BEM emulates a file system by encapsulating a collection of database tables as specified by a software developer implementing the IXFS system, and presenting them to an application as file system objects. Each table specified by the BEM corresponds to a directory and each row in the table corresponds to a file system object (e.g., subdirectory, file or link) present within the directory.

Figure 6:
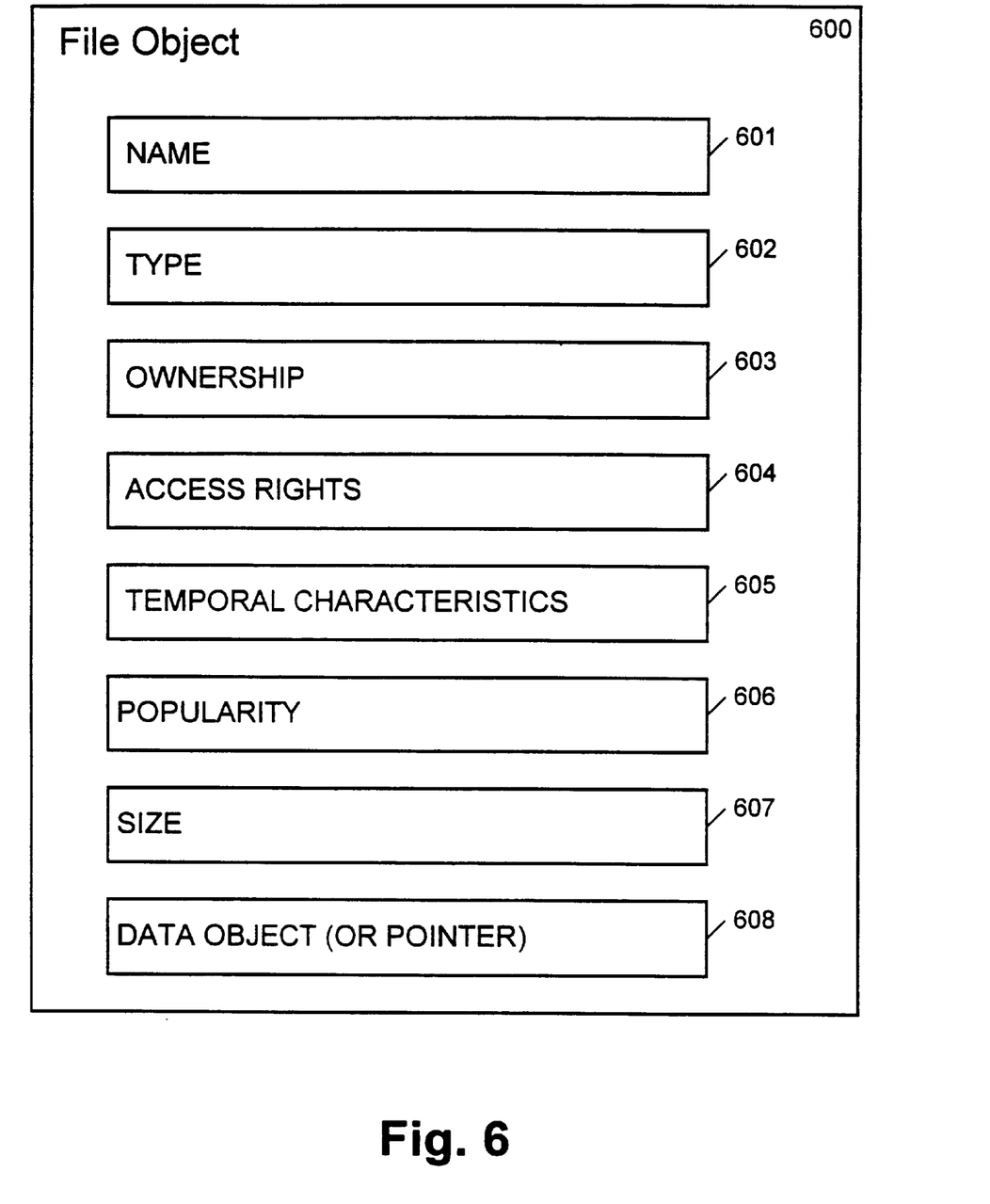
FIG. 6 is a data structure diagram for a file object.

For each database table that it encapsulates, the BEM includes a corresponding "file object" 600 having a data structure as shown in FIG. 6. The file system object 600 corresponds to, and provides an intuitive representation of, a directory, a file or a link in a file system. Each file object 600 includes the file object's name 601 (an identifier of a file system entity that is unique within a given directory), type 602 (directory, file or link), ownership 603 (an identifier of the file object's owner), access rights 604 (access rights to the object for its owner, community and others), temporal characteristics 605 (timestamp of last read, write and look-up operations), popularity 606 (number of links pointing to the object) and size 607 (object's size in bytes). The file object 600 also contains its corresponding data object 608 or a pointer to the data object.

Portions of a database are mapped to a file system representation by selecting database tables and rows as desired, and by designating the type of file system object to which each selected table and row corresponds. For example, the database of FIG. 1 was mapped into the file system hierarchy shown in FIG. 5C by specifying that each of the customer, order and inventory tables occupy a separate file object in the BEM of the type "directory." Within the file object for the customer table, each of the name, address and id rows have been designated as the type "directory," thereby making them appear as subdirectories to the hierarchically dominant customer directory. Within the "name" row in the "customer" table, the individual customer name entries have been designated in the file object as the type "file" making them appear as individual text files as shown in FIG. 5C.

Several different IXFS extension modules may be resident and operative at the same time to provide access to two or more different databases simultaneously or to access different information within the same database or to provide a different interpretation of the same database object. A single extension module is capable of presenting the same information in multiple different formats, for example, as different types of file system objects. In Fig. 5C, for example, the table of customers, including their names, addresses and IDs, could be presented as a single file system object—e.g., a Microsoft Excel file named "customer.xls" containing all of the customers' identifying information—which could be opened by an appropriate spreadsheet program that understands the "xls" format. The extension module could be configured so that the customer.xls file object is presented to the application either instead of, or in addition to, the x:\customer directory, its component subdirectories (name, address, id) and the files contained therein (Adams.txt, Andrews.txt, Brewster.txt, etc.).

As another example, an extension module could be configured to present the text files in x:\customer\name in several different formats for use by alternative application programs. In the database of FIG. 1, for example, multiple different file formats could be provided for each customer name by presenting multiple file system objects for a single database object. The database table entry for the customer Adams, could be mapped, for example, to three separate file system objects having different formats: "Adams.doc" for use with Microsoft Word, "Adams.wpd" for use with Corel Wordperfect, and "Adams.fm" for use with Adobe Framemaker. A user who edited the information in the "Adams.doc" object would observe that the changes automatically were reflected in the "Adams.wpd" and "Adams.fm" objects. Because all three of the file system objects are mapped to the same database object (namely, the database entry for customer Adams), the three alternative file system objects may be used interchangeably to view or edit the information for customer Adams without concern that divergent versions of Adams), information will result.

By employing the appropriate extension modules, whether obtained from a software library or generated according to custom specifications, software developers may enable database-unaware applications (e.g., Microsoft Word, Microsoft Excel, Lotus 1-2-3) to retrieve information stored in a database or to store new or modified information into the database. At the same time, database-aware applications may continue to access all of the information stored within the database, including information that was stored by database-unaware applications in the first instance. Together these capabilities enable a single enterprise-wide data repository to be maintained with various different applications, both database-aware and database-unaware, being able to access the information in the data repository. Moreover, IXFS facilitates the migration of data between different applications—for example, between a database-aware application and a database-unaware application or between two disparate database-unaware applications.

The IXFS system may be implemented by three different architectures: an object library architecture; a kernel level mountable file system architecture; or a network file system architecture. Details for implementing these three architectures are set forth in the IXFS Functional Specification, Appendix A.

In the first approach, the object library architecture, the ability to access information in a database is achieved through a set of software objects made available to database-unaware applications through a library —for example, a dynamic linked library (DLL) on a Microsoft Windows®-based platform. Using a consistent set of file system access methods that operate on the database, these software objects provide a functionality analogous to that provided by the common file access Application Program Interfaces (APIs) defined by the ANSI C or POSIX standards. Use of the object library architecture would require, however, any application to be used with the IXFS system first to be relinked with a new library of IXFS-related objects. The other two architectures, in contrast, allow existing applications to access database information without any changes to or relinking of the applications.

Figure 7:
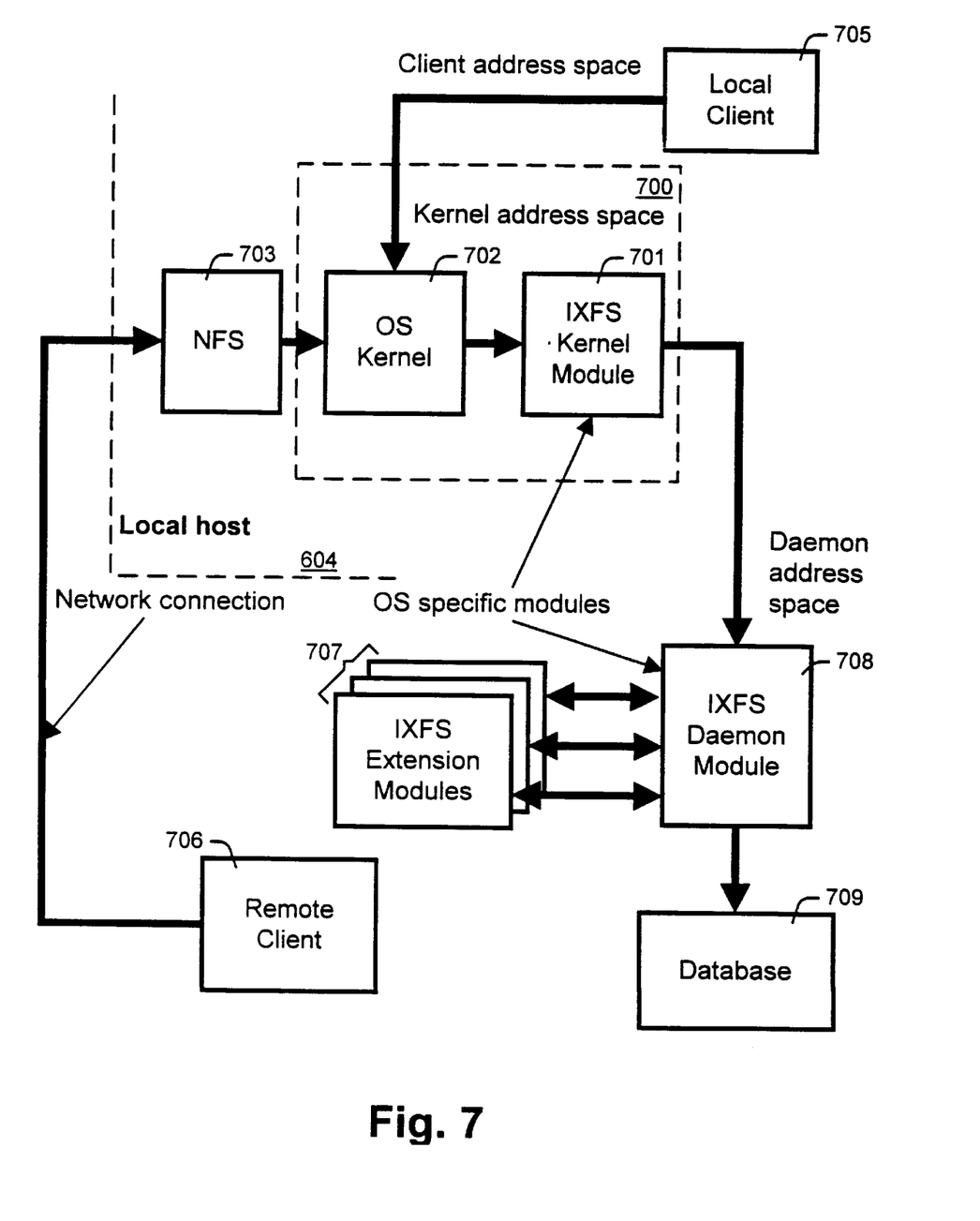
FIG. 7 is a diagram of a kernel level file system architecture.

The kernel level mountable file system architecture, illustrated in FIG. 7, intercepts file system requests at the operating system level and passes them on to the IXFS system for processing. In the kernel architecture, the kernel address space 700 is modified to include an IXFS kernel module 701 which is specific to the operating system being used (e.g., UNIX, Windows® NT). File system requests from application programs are received by the OS kernel 702 either from a local client 705 (an application residing in the address space of the local host 704) or from a remote client 706 (an application residing in the address space of a remote system) via NFS 703.

File system requests directed towards the namespace of the mounted file system devices (e.g., disk drives) are handled by NFS 703 in the conventional manner. File system requests that are directed to the namespace occupied by the database (as determined by the IXFS kernel module 701) are passed onto the IXFS daemon 708 (or the IXFS "service" in the case of Windows NT) for processing. The IXFS daemon 708 performs several functions including managing connections to the database 709 (or databases) to be accessed and maintaining a list of the filenames being used to access database objects. Upon receiving a request from the IXFS kernel module 701 to access the database 709, the IXFS daemon initializes a filename look-up procedure to identify the appropriate IXFS extension module 707 to handle the request. The filename specified by the request is used as an index into a look-up table of corresponding IXFS extension modules by comparing the specified filename to a list of names of file objects contained in each extension module. After determining which IXFS extension module includes a file object whose name matches the specified filename, the IXFS daemon 708 transfers the request to that extension module 707. The extension module translates the request into a database operation which is performed on the database 709. Any information generated in response to the database query operation is formatted by a method invoked by the IXFS extension module 707 into file system objects according to the file object types defined in the extension module. The formatted file system objects are then presented to the requesting application.

Figure 8:
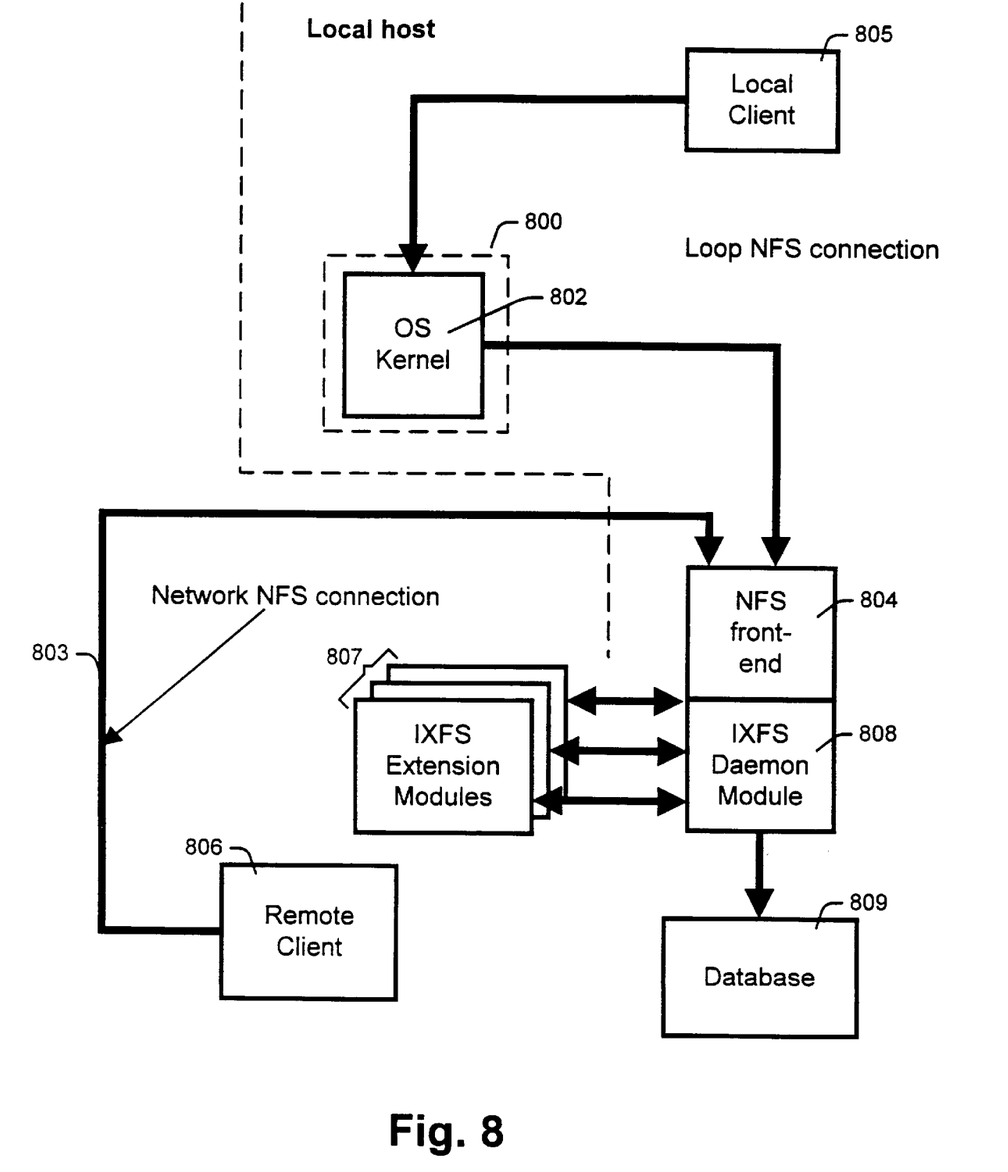
FIG. 8 is a diagram of a network file system architecture.

The network architecture, illustrated in FIG. 8, intercepts file system requests at the network level and passes them on to the IXFS system for processing. In the network architecture, the OS kernel address space need not be modified. Rather, all file system commands generated by a local client 805 or a remote client 806 are passed, via a loop NFS connection 810 or a network NFS connection 803, to a NFS front-end daemon (or service) 804, which resides outside of the OS kernel. The NFS front-end daemon 804 is implemented as a component of the IXFS daemon.

Upon receiving a file system request, the NFS front-end daemon 804 passes it on to the IXFS daemon 806 and subsequently to the appropriate IXFS extension module 807, which provide the same functionality as the IXFS daemon and IXFS extension modules in the kernel level architecture described above.

The IXFS system can be adapted to provide an interface to any type of database, including relational, object-relational and object-oriented databases, and to understand any other type of database query protocol in addition to SQL. NFS was chosen as the network protocol to be used in the IXFS implementation of FIG. 8 because NFS is a widely used standard for sharing files across different platforms. However, any other network protocol that provides access to file systems over a network—for example, Microsoft's Common Internet File System (CIFS)—couldbe used in implementing the IXFS network architecture.

The NFS protocol (version 2) allows clients and servers to exchange file information by using a "file handle"—a 32-byte value—to identify a desired file. When NFS is used as the network file system protocol in the network architecture, IXFS can make additional use of the NFS file handle to achieve greater speed and efficiency in performing file system requests on the database. To do so, IXFS encodes the NFS file handle with information that is specific to its operations as shown in FIG. 9.

Bytes 1–8 of the file handle hold the IXFS "magic string"—an entity that allows IXFS to distinguish IXFS file handles (i.e., file system requests directed to the file namespace assigned to the database) from NFS file handles (i.e., file system requests directed to the file namespace assigned to the file system). The magic string is an eight byte string in which each byte is assigned the value FF hexadecimal to identify a file handle as an IXFS file handle. Bytes 9 and 10 identify the particular IXFS extension module whose job it is to manage the file handle under consideration. Encoding an IXFS file handle in this manner obviates the need to maintain an empty ("shadow") directory tree in the file system, which otherwise would be needed to generate standard NFS file handles that correspond to information managed by the IXFS system. Similarly, this encoding scheme makes it unnecessary to maintain a distinct mapping entity (e.g., look-up table) between NFS file handles and IXFS file handles.

Figure 9:
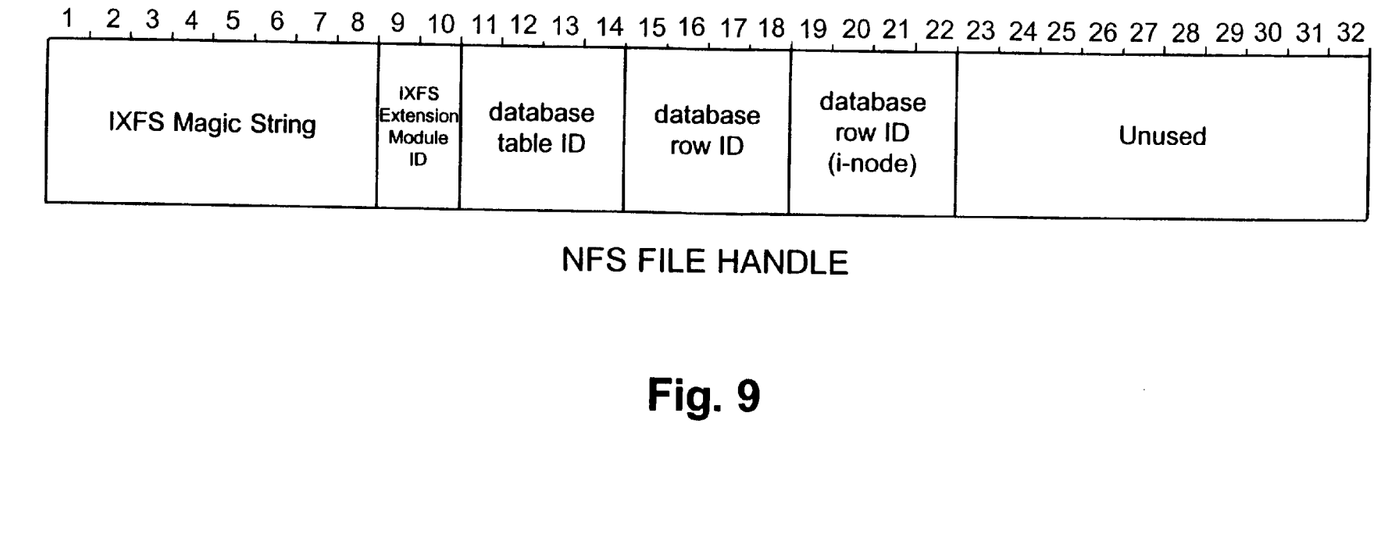
FIG. 9 is a data diagram of a NFS file handle as used in the network file system architecture of FIG. 8.

The remaining bytes of the NFS file handle in FIG. 9 include information that is specific to the extension module identified by the extension module identified by bytes 9 and 10 of the file handle. Bytes 11–14 and 15–18 respectively identify the database table and row that correspond to the file handle. Bytes 19–22 identify the i-node (information node) table and row which correspond to metadata descriptive of file attributes, and a pointer to the data in the database, for the file handle under consideration. Bytes 19–32 presently are unused but they are available for use by any newly developed extension modules. As a result of the encoding represented in FIG. 9, the efficiency with which elements may be located in the database is enhanced and the complexity of designing new IXFS extension modules is reduced.

The kernel level and network architectures provide different advantages relative to one another. The kernel level approach is the more efficient of the two in that it provides a shorter data path between the issuance of the file system request to the return of file system objects from IXFS. On the other hand, the network-based architecture significantly minimizes the effort required to port the IXFS between different platforms because implementing the network architecture does not require a modification to the operating system kernel. In both cases, however, the IXFS system provides a database-unaware application with transparent access to data in a database, while maintaining the inherent advantages of using a database for persistent data storage.

The methods and mechanisms described here are not limited to any particular hardware or software configuration, but rather they may find applicability in any computing or processing environment in which database manipulation may be performed.

The techniques described here may be implemented in hardware or software, or a combination of the two. Preferably, the techniques are implemented in computer programs executing on programmable computers that each include a processor, a storage medium readable by the processor (including volatile and non-volatile memory and/or storage elements), and suitable input and output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method, performed on a computer system, of accessing information in a database, the method comprising:
    making information corresponding to a set of database objects available as a file system structure having one or more file system objects;
    receiving from an application a file system request corresponding to the available one or more file system objects; and
    transforming the file system request from the application into a database operation; wherein making the information available as a file system structure having one or more file objects is performed transparently to the application.

2. The method of claim 1 further comprising performing the database operation on the database using a database engine.

3. The method of claim 1 further comprising retrieving information from the database in response to the database operation.

4. The method of claim 1 further comprising returning the information associated with the database object to the application as a file system object.

5. The method of claim 4 in which the returning comprises arranging the retrieved information in a format defined in an extension module.

6. The method of claim 5 further comprising displaying the formatted information on a display screen of a computer.

7. The method of claim 1 further comprising displaying information associated with the database object on a display screen of a computer.

8. The method of claim 7 in which the information associated with the database object is displayed as a graphical representation of a file system object.

9. The method of claim 1 in which the application that issued the file system request comprises a database-unaware application.

10. The method of claim 1 in which the database comprises a relational database.

11. The method of claim 1 in which the database comprises an object-relational database.

12. The method of claim 1 in which the database comprises an object-oriented database.

13. The method of claim 1 in which the transforming comprises converting the file system request into a database query.

14. The method of claim 13 in which the database query comprises an SQL-compliant query.

15. The method of claim 1 in which the transforming comprises converting the file system request into a database query based on information contained within an extension module.

16. The method of claim 1 further comprising determining whether the received file system request corresponds to information managed by a file system.

17. The method of claim 16 further comprising conveying the file system request to the file system if the file system request is determined to correspond to information managed by the file system.

18. The method of claim 16 in which the determining comprises identifying a namespace to which the file system request is directed.

19. The method of claim 16 in which the determining is performed by a method executing in a kernel address space of an operating system associated with the computer system.

20. The method of claim 16 in which the determining is performed by a method executing external to an operating system associated with the computer system.

21. The method of claim 1 in which the database object comprises a table.

22. The method of claim 1 in which the file system object comprises a directory, a file or a link.

23. The method of claim 1 in which making the information available as a file system structure comprises presenting the information as plural file system by objects in formats understandable by different applications.

24. The method of claim 1 further comprising, prior to making the information available, accessing an extension module that specifies the set of database objects or the file system structure or both.

25. A computer-based method of accessing information in a database, the method comprising:
    retrieving information corresponding to a set of database objects from the database; and
    presenting the retrieved information to an application as a file system structure having one or more file system objects; accessing, prior to retrieving information, an extension module that specifies the sets of database objects or the file structure or both.

26. The method of claim 25 further comprising identifying the information to be retrieved from the database by specifying a database object from among database objects in the database.

27. The method of claim 26 in which the identifying comprises recording in an extension module information descriptive of a predetermined set of database objects.

28. The method of claim 27 in which the retrieving comprises selectively extracting information from the database based on information contained in the extension module.

29. The method of claim 27 in which the presenting comprises formatting the selectively extracted information into the file system structure having one or more file system objects based on information contained in the extension module.

30. The method of claim 25 in which the file system structure represents a hierarchial file system having directories, files, links or a combination thereof.

31. A computer-based data repository management system comprising;
    a database of information organized into database objects;
    a file system-based, database-unaware application program for manipulating data in the form of file system objects; and a file system interface to the database which makes information corresponding to a set of database objects available to the file system-based application as a file system structure having one or more file system objects.

32. The system of claim 31 in which the file system-based application is database-unaware.

33. The system of claim 32 in which the database comprises an object-relational database.

34. The system of claim 32 in which the database comprises a relational database.

35. The system of claim 32 in which the database comprises an object-oriented database.

36. The system of claim 33 further comprising a database management system for managing information in the database.

37. The system of claim 31 further comprising a database engine for performing database operations on the database, the file system interface receiving file system requests and transforming the received requests into a form understandable by the database engine.

38. The system of claim 31 further comprising a module for differentiating file system requests directed to the file system from file system requests directed to the file system interface.

39. The system of claim 31 in which the file system interface further comprises an extension module that includes a file object.

40. The system of claim 39 in which the file object comprises information for converting database objects into file system objects.

41. The system of claim 31 in which the file system interface comprises a plurality of extension modules each of which includes information for converting a different set of database objects into file system objects.

42. The system of claim 31 in which the file system interface comprises a plurality of extension modules each of which includes information for converting a single database object into multiple file system objects.

43. The system of claim 31 further comprising an extension module that specifies the set of database objects or the file system structure or both.

44. A computer program, residing on a computer readable medium, for a data repository management system comprising a file system-based, database-unaware application and a database, the computer program comprising instructions to cause a computer system to perform the following operations:

receive a file system request issued by the file system-based application;

convert the file system request into a database operation;

retrieve information corresponding to a set of database objects from the database by performing the database operation on the database;

transform the retrieved information into a file system structure having one or more file system objects according to predetermined criteria; and present the one or more file system objects to the file system-based application.

45. The software of claim 44 further comprising instructions that access an extension module that specifies the set of database objects or the file system structure or both.

46. A method, performed on a computer system, of accessing information in a database, the method comprising:

making information corresponding to a set of database objects available to a database-unaware application as a file system structure having one or more file system objects;

receiving from the database-unaware application a file system request corresponding to the available file system structure having one or more file system objects;

transforming the file system request from the database-unaware application into a database operation;

performing the database operation on the database using a database engine;

retrieving information from the database in response to the database operation; and returning the information associated with the database object to the database-unaware application as one or more file system objects.

47. The method of claim 46 further comprising, prior to making the information available, accessing an extension module that specifies the set of database objects or the file system structure or both.

48. A computer-based method of accessing information in a database, the method comprising:

encoding a file handle with information that specifies a set of database objects in a database;

transmitting the encoded file handle in response to a file system request issued by a database-unaware application; and decoding the received file handle to identify the set of database objects associated with the file system request.

49. The method of claim 48 in which the encoding is based on the NFS protocol.

50. The method of claim 48 in which the encoding comprises including information in the file handle that identifies an extension module that corresponds to the issued file system request.

51. The method of claim 48 in which the encoding comprises including information in the file handle that identifies a database table and row that correspond to the issued file system request.

52. The method of claim 48 in which the encoding comprises including information in the file handle that identifies metadata that corresponds to the issued file system request.

53. The method of claim 48 in which the encoding comprises including information in the file handle that points to the set of database objects that correspond to the issued file system request.

54. The method of claim 48 further comprising, prior to encoding the file handle, accessing an extension module that specifies the set of database objects.

* * * * *